March 24, 1925.
G. E. KOEHLER
OPHTHALMIC MOUNTING
Filed Feb. 25, 1924
1,530,604
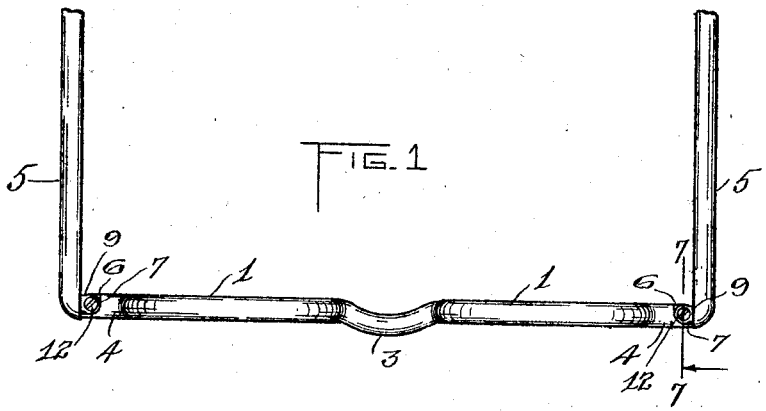
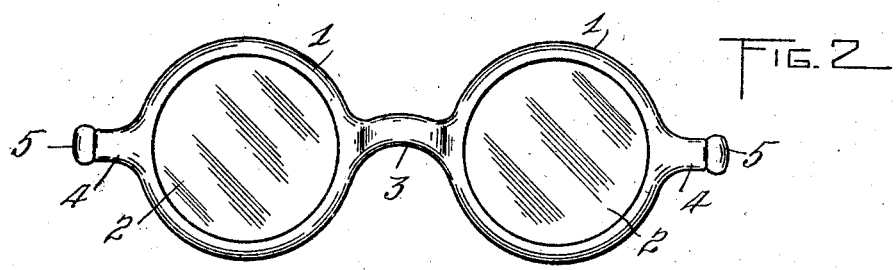
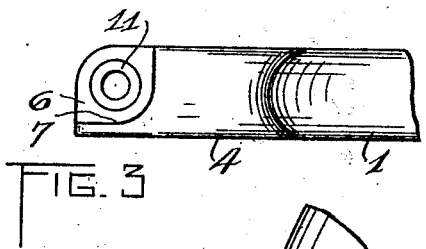
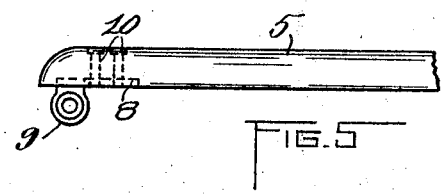
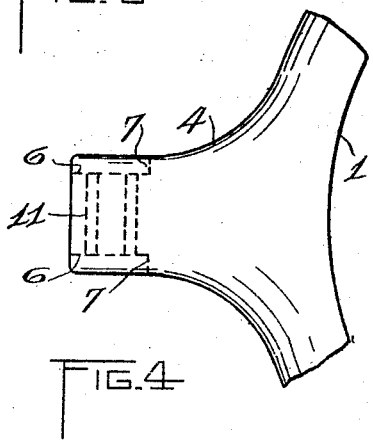
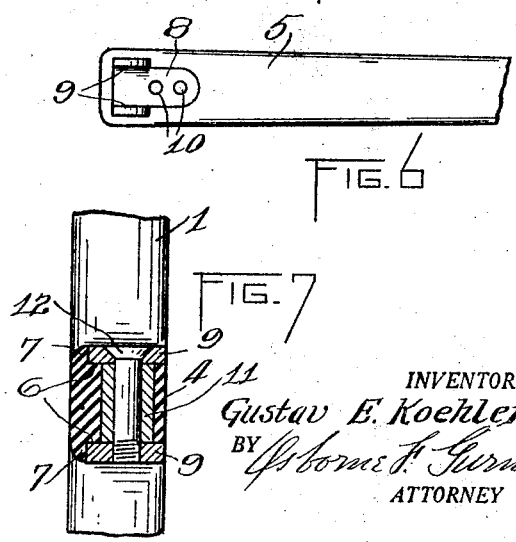
INVENTOR.
Gustav E. Koehler
BY
ATTORNEY Patented Mar. 24, 1925.

1,530,604

UNITED STATES PATENT OFFICE.

GUSTAV E. KOEHLER, OF ROCHESTER, NEW YORK.

OPHTHALMIC MOUNTING.

Application filed February 25, 1924. Serial No. 694,897.

*To all whom it may concern:*

Be it known that I, GUSTAV E. KOEHLER, a citizen of the United States, residing at Rochester, in the county of Monroe and State of New York, have invented a new and useful Improvement in Ophthalmic Mountings, of which the following is a specification.

The present invention relates to ophthalmic mountings in which the frame and bows or temples are made of tortoise shell or other such comparatively soft non-metallic material and more particularly to the flexible connection of the temples to the frame, an object of the invention being to provide a hinge joint for such parts that will be strong, neat in appearance and of such simple construction as to eliminate certain parts usually employed in mountings of this character and also a number of tooling operations, thus reducing manufacturing cost.

I accomplish the said object by using but one leaf of a metal hinge which is secured to one of the parts and pivoting this hinge member directly to the other part, and a further object of the invention is to reinforce this connection, so as to prevent the joint from becoming loose and wobbly or a fracture of the non-metallic material due to possible strains on the temples, by inserting a bushing, preferably of metal, for the pintle or pivot screw in the part on which the hinge member turns. In this instance the hinge leaves are secured to the temples or bows while the bushings for their respective pivot screws are inserted in the side lugs formed on the lens-enclosing rims.

Another object of the invention is to so form the side lugs on the rims that the hinge members will be invisible from the front of the mounting.

And, another object of the invention is, in having the axes of the hinge connections through the side lugs of the rims, to round the inner end edges of the lugs to permit the temples being swung inwardly and to leave the outer edges square to form stops or abutments for limiting outward movement of the temples.

To these and other ends the invention consists of certain parts and combinations of parts as will be fully set forth in the following description and particularly defined in the appended claims.

The accompanying drawings illustrating a preferred embodiment of the invention are as follows:

Figure 1 is an edge view of the frame with the temples attached and swung to open position.

Fig. 2 is a front view of the frame as seen in Fig. 1.

Figs. 3 and 4 are enlarged edge and front views, respectively, of a fragmentary portion of the frame showing one of the side lugs.

Figs. 5 and 6 are enlarged edge and inner face views, respectively, of one of the temples with hinge member attached.

And, Fig. 7 is an enlarged sectional detail on the line 7—7, Fig. 1.

Similar reference numerals refer to similar parts throughout the several views.

The frame which, as stated, is of tortoise shell or other such comparatively soft non-metallic material comprises the rims 1, formed with grooves not shown for receiving the peripheral edges of the lenses 2, the bridge 3, and the usual outwardly projecting side lugs 4 on the rims and to which the temples 5, also of non-metallic material, are hingedly connected. In this instance the end of each lug 4 in rear of its front face is reduced to form top and bottom recesses 6 and a shoulder 7 for each recess which extends both longitudinally and transversely of the frame. The recesses 6 thus formed are substantially rectangular with two adjoining sides open and the shoulders 7 forming walls for the other two sides.

Each temple or bow 5 is recessed adjacent the end of its inner face to receive the plate portion 8 of a metal hinge leaf which is also formed with spaced laterally extending ears 9, the plate portion 8 being secured to the temple by suitable fastening devices as the screws 10. The ears 9 astride the reduced end portion of the lug 4, engage in the opposing recesses 6 and bear against the end faces of a bushing 11 inserted in such reduced lug portion, the ears 9 being provided with aligned apertures one of which is countersunk and the other threaded to receive, respectively, the head and threaded end of a pivot screw 12 which turns in the bushing 11. The end face of each lug 4 has its inner edge rounded to permit the temple being swung inwardly, while the forward portion of such face is flat and at right angles to the plane of the rim so as to form a stop or abutment for the temple when the latter is swung to open position.

By use of the bushings 11 I provide reinforcement for the reduced end portions of the lugs 4 which permits the temples being hinged directly to these parts without the danger of fracturing the material surrounding the bushings or of the joint becoming loose or wobbly due to lateral strains on the temples. Also, by this construction there is a shorter leverage between the temples and the rims than when a counter part similar to the hinge leaf 8 is employed, thus strengthening the connection against torsional strains and the danger of such strains is further reduced due to the fact that the ear members 9 always turn against the rounded corners of the angular shoulders 7 and for all angular positions of the temples the inner faces thereof bear directly against the lugs 4. Furthermore, the longitudinally extending portions of the shoulders 7 cover the hinge ears 9 so that the latter or any parts of the hinges are invisible from the front of the mounting.

What I claim is:—

1. In an ophthalmic mounting, the combination with a frame of non-metallic material comprising lens-enclosing rims, a bridge, and lugs projecting outwardly from the rims, such lugs being recessed on top and bottom to form reduced end portions and for each recess a shoulder extending both longitudinally and transversely of the frame, of a metal bushing inserted in each of said reduced end portions.

2. In an ophthalmic mounting, the combination with a frame of non-metallic material comprising lens-enclosing rims, a bridge, and lugs projecting outwardly from the rims and formed with shoulders and reduced end portions, of a metal bushing inserted in each of said end portions, the end face of each such portion being rounded at its inner edge and having its forward part at a right angle to the plane of the rims.

3. In an ophthalmic mounting, the combination with a frame of non-metallic material comprising lens-enclosing rims, a bridge, and lugs projecting outwardly from the rims and formed with shoulders and reduced end portions, of a metal bushing inserted in each of said end portions, the end face of each such portion being rounded at its inner edge and having its forward part at a right angle to the plane of the rims, and each of said shoulders extending both longitudinally and transversely of the frame with its corner rounded concentric with the rounded end of the lug.

4. An ophthalmic mounting including a lens-enclosing rim, a lug on said rim and a temple, all of non-metallic material, said lug being formed with shoulders and a reduced end portion, and a connection comprising a bushing in said reduced lug portion, spaced laterally extending ears on the temple and engaging over said reduced lug portion, and a pivot carried by said ears and turning in said bushing, the ears turning against said shoulders and the inner face of the temple bearing against said lug for all angular positions of the temple.

5. An ophthalmic mounting including a lens-enclosing rim, a lug on said rim and a temple, all of non-metallic material, said lug being formed with shoulders and a reduced end portion, each shoulder extending both longitudinally and transversely of the rim, and a connection comprising a bushing in said reduced lug portion, spaced laterally extending ears on the temple and engaging over said reduced lug portion, and a pivot carried by said ears and turning in said bushing, the ears turning against said shoulder and the inner face of the temple bearing against said lug for all angular positions of the temple.

6. An ophthalmic mounting including a lens-enclosing rim, a lug on said rim and a temple, all of non-metallic material, said lug being formed with shoulders and a reduced end portion, and a connection comprising a bushing in said reduced lug portion, a hinge leaf secured to the temple, laterally extending ears on said leaf for astriding said reduced lug portion, and a pivot carried by said ears and turning in said bushing, the ears turning against said shoulders and the inner face of the temple bearing against said lug for all angular positions of the temple, the end face of said lug having its inner edge rounded and its forward part at a right angle to the plane of said rim.

7. An ophthalmic mounting including a lens-enclosing rim, a lug on said rim and a temple, all of non-metallic material, and a connection between the lug and temple comprising a bushing in one of said parts, such part being recessed on top and bottom to form a reduced portion and for each recess a shoulder extending both longitudinally and transversely of the part, a hinge leaf secured to the inner face of the other part, ears formed on said hinge leaf for turning against the ends of said bushing, and a pivot carried by said ears and turning in the bushing.

GUSTAV E. KOEHLER.